(12) United States Patent
Ridgway et al.

(10) Patent No.: US 6,931,192 B2
(45) Date of Patent: Aug. 16, 2005

(54) CONTOURED ELECTRIC FIELDS AND POLING IN POLARIZATION-INDEPENDENT WAVEGUIDES

(75) Inventors: Richard William Ridgway, Westerville, OH (US); Van Earl Wood, Delaware, OH (US); David William Nippa, Dublin, OH (US)

(73) Assignee: Battelle Memorial Institute, Columbus, OH (US)

( * ) Notice: Subject to any disclaimer, the term of this patent is extended or adjusted under 35 U.S.C. 154(b) by 0 days.

(21) Appl. No.: 10/877,551

(22) Filed: Jun. 25, 2004

(65) Prior Publication Data

US 2004/0234189 A1 Nov. 25, 2004

Related U.S. Application Data

(60) Division of application No. 10/098,730, filed on Mar. 15, 2002, now Pat. No. 6,782,149, which is a continuation-in-part of application No. 09/916,238, filed on Jul. 26, 2001, now Pat. No. 6,687,425.

(51) Int. Cl.$^7$ .................................................. G02B 6/10
(52) U.S. Cl. ......................... 385/129; 385/132; 385/40
(58) Field of Search ................................ 385/129, 132, 385/40

(56) References Cited

U.S. PATENT DOCUMENTS

| 3,558,213 A | 1/1971 | Marcatili |
| 3,589,794 A | 6/1971 | Marcatili |

(Continued)

FOREIGN PATENT DOCUMENTS

| EP | 0335672 A | 10/1989 |
| EP | 0513919 A | 11/1992 |

(Continued)

OTHER PUBLICATIONS

HF Schlaak, Modulation Behaviour of Integrated Optical Directional Couplers, Journal of Optical Communications, 1984, 122–131.

(Continued)

*Primary Examiner*—Akm Enayet Ullah
*Assistant Examiner*—James D. Stein
(74) *Attorney, Agent, or Firm*—Dinsmore & Shohl LLP (57) ABSTRACT

The present invention provides for polarization independence in electrooptic waveguides. Specifically, in accordance with one embodiment of the present invention, an electrooptic waveguide for an optical signal is provided. The waveguide comprises a plurality of control electrodes, an optical waveguide core defining a primary axis of propagation, and an electrooptic cladding at least partially surrounding the core. The control electrodes are positioned to generate a contoured electric field across the cladding. The cladding is poled along a poling contour. The contoured electric field and/or the poling contour are asymmetric relative to a plane intersecting the waveguide core and extending along the primary axis of propagation. The electrooptic cladding defines at least two cladding regions on opposite sides of the waveguide core. The contoured electric field comprises (i) a vertical electric field component within a first one of said pair cladding regions that is larger than a vertical component in a second one of the cladding regions and (ii) a horizontal electric field component within the first cladding region that is smaller than a horizontal component in the second cladding region.

3 Claims, 6 Drawing Sheets

U.S. PATENT DOCUMENTS

| | | | |
|---|---|---|---|
| 3,850,503 | A | 11/1974 | Riseberg et al. |
| 4,070,094 | A | 1/1978 | Martin |
| 4,730,171 | A | 3/1988 | So et al. |
| 4,737,014 | A | 4/1988 | Green |
| 4,884,858 | A | 12/1989 | Ushikubo et al. |
| 4,896,930 | A | 1/1990 | Tsuchitani et al. |
| 4,936,645 | A | 6/1990 | Yoon et al. |
| 5,045,364 | A | 9/1991 | Fang |
| 5,138,687 | A | 8/1992 | Horie et al. |
| 5,243,680 | A | 9/1993 | Soane |
| 5,513,283 | A | 4/1996 | Whang et al. |
| 5,533,151 | A | 7/1996 | Leonard |
| 5,546,480 | A | 8/1996 | Leonard |
| 5,581,642 | A | 12/1996 | Deacon et al. |
| 5,659,010 | A | 8/1997 | Sotoyama et al. |
| 5,703,710 | A | 12/1997 | Brinkman et al. |
| 5,724,461 | A | 3/1998 | Bruno et al. |
| 5,732,177 | A | 3/1998 | Deacon et al. |
| 5,751,867 | A | 5/1998 | Schaffner et al. |
| 5,818,983 | A | 10/1998 | Yoshimura et al. |
| 5,825,525 | A | 10/1998 | Harwit |
| 5,835,644 | A | 11/1998 | Oh et al. |
| 5,854,866 | A | 12/1998 | Leonard |
| 5,857,039 | A | 1/1999 | Bosc et al. |
| 5,862,276 | A | 1/1999 | Karras |
| 5,887,089 | A | 3/1999 | Deacon et al. |
| 5,970,186 | A | 10/1999 | Kenney et al. |
| 6,022,671 | A | 2/2000 | Binkley et al. |
| 6,028,973 | A | 2/2000 | Schienle et al. |
| 6,137,619 | A | 10/2000 | Chen et al. |
| 6,144,779 | A | 11/2000 | Binkley et al. |
| 6,167,169 | A | 12/2000 | Brinkman et al. |
| 6,195,479 | B1 | 2/2001 | Pan |
| 6,243,517 | B1 | 6/2001 | Deacon |
| 6,320,990 | B1 | 11/2001 | Sun |
| 6,507,681 | B1 | 1/2003 | Kowalczyk et al. |
| 2002/0094150 | A1 | 7/2002 | Lim et al. |
| 2003/0206675 | A1 * | 11/2003 | Glebov et al. ................. 385/8 |
| 2004/0136674 | A1 * | 7/2004 | Hong et al. ................. 385/132 |

FOREIGN PATENT DOCUMENTS

| | | |
|---|---|---|
| EP | 0898348 A | 2/1999 |
| GB | 2236402 A | 4/1991 |
| WO | WO 00/28355 | 5/2000 |
| WO | WO 03/010592 A2 | 2/2003 |
| WO | WO 03/012532 A2 | 2/2003 |

OTHER PUBLICATIONS

Eaj Marcatili, Dielectric Rectangular Waveguide and Directional Couper for Integrated Optics, Bell Syst. tech. J., vol. 48, pp. 20–111, Sep. 1969.

C Themistos et al., Design Considerations for an Electrooptic Directional Coupler Modulator, Journal of Lightwave Technology, vol. 17, No. 4, Apr. 1999.

Arkady Kaplan et al., Layout for Polarization Insensitive Modulation In LiNbO3 Waveguides; IEEE Journal of Selected Topics in Quantum Electronics; Jan. 2000; pp. 83–87; vol. 6, No. 1; IEEE; Israel.

Muto S. et al., "Slab Waveguide–Type Optical Modulators Using Optically Active and Nonlinear Polymers", Molecular Crystals and Liquid Crystals Science and Technology Section B: Nonlinear Optics, vol. 22, No. 1–4, 1999, pp. 449–452.

Oh Hyun–Ho et al., Polarization–independent phase modulator using electro–optic polymer:, Electronics Letters, IEE Stevenage, GB, vol. 36, No. 11, May 25, 2000, pp. 969–970.

Yoshito Shuto et al., "Optical Intensity Modulators Using Diazo–Dye Substituted Polymer Channel Waveguides", IEEE Journal of Quantum Electronics, IEEE Inc., vol. 31, No. 8, Aug. 1, 1995, pp. 1451–1460.

\* cited by examiner

CONTOURED ELECTRIC FIELDS AND POLING IN POLARIZATION-INDEPENDENT WAVEGUIDES

CROSS-REFERENCE TO RELATED APPLICATIONS

This application is a division of application Ser. No. 10/098,730, filed Mar. 15, 2002 now U.S. Pat. No. 6,782,149 and entitled "CONTOURED ELECTRIC FIELDS AND POLING IN POLARIZATION-INDEPENDENT WAVEGUIDES"; which is a continuation-in-part of U.S. patent application Ser. No. 09/916,238 filed Jul. 26, 2001 now U.S. Pat. No. 6,684,425, and is related to U.S. patent application Ser. Nos. 10/098,731 filed Mar. 15, 2002, and Ser. No. 09/777,439 filed Feb. 6, 2001, the three disclosures of which are incorporated herein by reference

BACKGROUND OF THE INVENTION

The present invention relates to optical signal transmission and, more specifically, to the use of contoured electric fields and contoured poling in polarization-independent optical waveguides for applications requiring modulation and switching of optical signals.

It is becoming increasingly important to frequently upgrade telecommunication networks to increase their capacity due to the recent rapid increase in network traffic caused by multimedia communications. Although optical technologies are replacing most transmission lines, the nodes of optical networks, such as switching and cross-connect nodes, still depend on relatively slow electrical technologies. Fore example, time-division multiplexing (TDM) systems are widely used in existing optical communications systems and are inherently dependent on electrical circuits for multiplexing and demultiplexing. As a result, the electrical nodes in these types of optical networks limit throughput.

There has been a recent shift in the industry towards an emphasis on accelerating returns on existing and upgraded networks. Companies trying to pioneer the integrated optics market, however, have run head-on into the challenge of cost-effectively integrating optical components and microelectronic technology into a single device. Accordingly, there is a need in the art for innovation in integrated component design for optical switching, modulating, attenuating, multiplexing and demultiplexing devices.

BRIEF SUMMARY OF THE INVENTION

The above-noted patent application, U.S. patent application Ser. No. 09/992,552, describes in detail a number of optical waveguides designed for polarization-independent operation. One of the illustrated embodiments is directed to providing polarization independence by arranging the control electrodes and waveguide core such that appropriate poling orientations are provided in each cladding region. The waveguide achieves polarization independence by optimizing phase shifting of one dominant polarization (TE) in the first cladding region and the other dominant polarization (TM) in the second cladding region. The present invention employs similar means for providing polarization independence and presents further polarization-independent waveguide configurations. The present invention also relates to improved integrated optical devices employing the polarization-independent waveguide configurations of the present invention. Suitable waveguide devices are known in the art and are disclosed in the above-noted patent application (Ser. No. 09/992,552).

Figure 1:
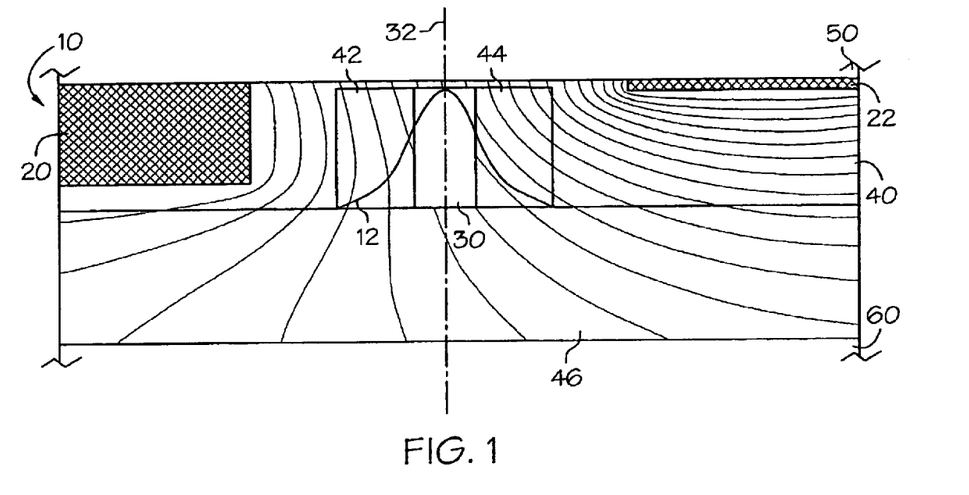
FIGS. 1 and 2 illustrate optical waveguides according to two different embodiments of the present invention.
Figure 2:
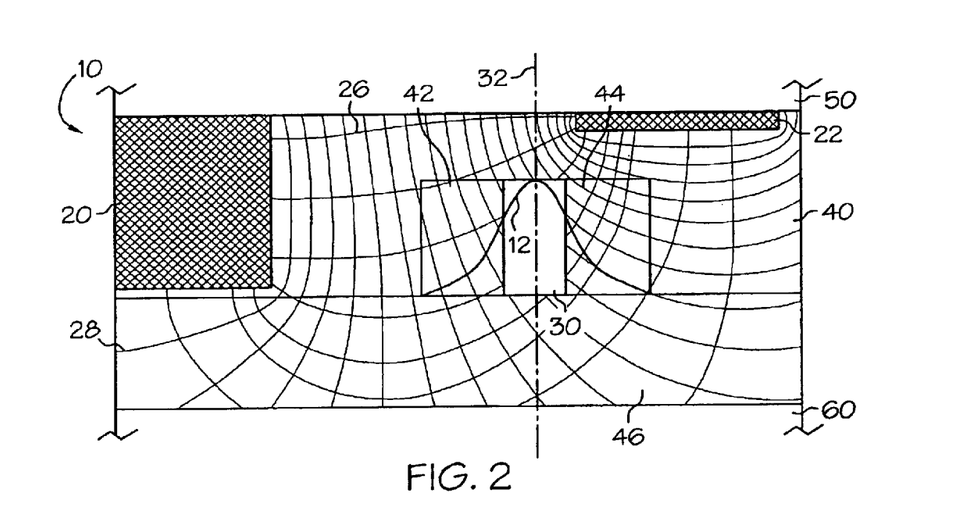

Referring briefly to FIGS. 1 and 2, an electrooptic waveguide 10 is illustrated including first and second control electrodes 20, 22, and an optical waveguide core 30. An intersecting plane 32 normal to the surface of the waveguide core 30 and extending along the primary axis of propagation defined by the waveguide core 30 is also illustrated. For the purposes of describing and defining the present invention, it is noted that TE and TM polarized light represent two independent electromagnetic modes of an optical signal. The electromagnetic field distribution is referred to as the transverse electric (TE) mode where the electric field of the optical signal is perpendicular to the intersecting plane 32. The electromagnetic field distribution is referred to as the transverse magnetic (TM) mode where the magnetic field of the optical signal is perpendicular to the intersecting plane 32. It is also noted that in a channel waveguide of the illustrated type, the propagating modes are not purely TE or TM polarized. Rather, the modes are typically more predominantly one or the other and are commonly so designated. Accordingly, a TE polarized mode may merely comprise a distribution where the electric field component parallel to the plane of propagation is the largest component of the signal. Similarly, a TM polarized mode may merely comprise a distribution where the magnetic field component parallel to the plane of propagation is the largest component of the signal.

Specifically, in accordance with one embodiment of the present invention, an electrooptic waveguide for an optical signal is provided. The waveguide comprises a plurality of control electrodes, an optical waveguide core, and electrooptic cladding regions optically coupled to the optical waveguide core. The control electrodes are positioned to generate a contoured electric field across the cladding. The cladding is poled along a poling contour. The cladding defines an array of local TM indices of refraction $n_{TM}$ corresponding to the indices of refraction for the vertically oriented component TM of the optical signal in the cladding. The cladding also defines an array of local TE indices of refraction $n_{TE}$ corresponding to the indices of refraction for the horizontally oriented component TE of the optical signal in the cladding. The local TM indices $n_{TM}$ and the local TE indices $n_{TE}$ are each a function of a first electrooptic coefficient $r_{PP}$ for light parallel to a local component of the contoured electric field and a second electrooptic coefficient $r_{1P}$ for light perpendicular to a local component of the contoured electric field. The difference between the first and second electrooptic coefficients $r_{PP}$ and $r_{1P}$ defines an optical birefringence of an electrooptic cladding material defining the cladding. The local TM indices $n_{TM}$ collectively define a TM mode index of the waveguide. The local TE indices $n_{TE}$ collectively define a TE mode index of the waveguide. The respective orientations of the contoured electric field and the poling contour are configured to compensate for the optical birefringence of the electrooptic cladding material such that the TM mode index of the waveguide is substantially equal to the TE mode index of the waveguide.

In accordance with another embodiment of the present invention, an electrooptic waveguide for an optical signal is provided. The waveguide comprises a plurality of control electrodes, an optical waveguide core defining a primary axis of propagation, and an electrooptic cladding at least partially surrounding the core. The control electrodes are positioned to generate a contoured electric field across the cladding. The cladding is poled along a poling contour. Either the contoured electric field, the poling contour, or both are asymmetric.

In accordance with yet another embodiment of the present invention, an electrooptic waveguide for an optical signal is provided. The waveguide comprises a plurality of control electrodes, an electrooptic optical waveguide core defining a primary axis of propagation, and a cladding at least partially surrounding the core. The control electrodes are positioned to generate a contoured electric field across the core. The core is poled along a poling contour. Either the contoured electric field, the poling contour, or both are asymmetric.

In accordance with yet another embodiment of the present invention, a process is provided wherein an electrooptic waveguide is formed by: providing a waveguide substrate; positioning an optical waveguide core over a first surface of the substrate; providing a waveguide superstrate; forming at least two control electrodes on a first surface of the superstrate, wherein the control electrodes define selected electrode thicknesses; positioning a viscous electrooptic cladding material over one or both of the first surface of the substrate and the first surface of the superstrate; and urging the first surface of the waveguide substrate and the first surface of the waveguide superstrate toward each other to create a layer of cladding material between the surfaces. The cladding material, which is subsequently cured, defines a cladding material viscosity selected to permit dispersion of the cladding material about the control electrodes and the core as the first surface of the waveguide substrate and the first surface of the waveguide superstrate are urged toward each other. The cladding material is provided in a quantity sufficient to ensure that the layer of cladding material defines a cladding layer thickness at least as large as the selected electrode thicknesses.

Accordingly, it is an object of the present invention to provide improved electrode arrangements for polarization-independent waveguides, improved integrated optical devices incorporating such waveguides, and processes for manufacturing such waveguides. Other objects of the present invention will be apparent in light of the description of the invention embodied herein.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals and in which.

DETAILED DESCRIPTION

Although a number of alternative waveguide configurations are contemplated by the present invention, many of the general principles of the present invention may be described with reference to the waveguide configurations of FIGS. 1 and 2. Alternative waveguide configurations are illustrated schematically in FIGS. 3–10, 12, and 13 and are discussed in further detail below.

Referring initially to FIGS. 1 and 2, an electrooptic waveguide 10 according to one embodiment of the present invention is illustrated. The waveguide 10 comprises first and second control electrodes 20, 22, an optical waveguide core 30, and a cladding 40 optically coupled to the optical waveguide core 30. The cladding 40 is delineated into first and second lateral cladding regions 42, 44 and a bottom cladding region 46 for illustrative purposes. The delineated cladding regions 42, 44, 46 and the remaining cladding areas within the cladding 40 may be formed of like or different materials, depending upon the desired operational characteristics of the cladding 40 and the waveguide 10. A silica superstrate 50 and a silicon substrate 60, which are merely partially illustrated in FIGS. 1 and 2, typically form the respective top and bottom surfaces of the waveguide 10. The optical waveguide core 30 may comprise an electrooptic polymer, silica, or doped silica. Similarly, the cladding 40 may comprise an electrooptic polymer, silica, or doped silica and may include different materials in different regions thereof. For example, the first and second lateral cladding regions 42, 44 may comprise an electrooptic polymer while the bottom cladding region 46 may comprise silica.

The refractive index of the optical waveguide core 30 is slightly higher than that of the surrounding cladding 40. As a result, the waveguide 10 is well suited for guiding an optical signal. According to one embodiment of the present invention, a doped silica waveguide core 30 is envisioned with a refractive index that is 0.7% higher than the silica bottom cladding region 46. This provides good confinement, yet allows some of the light to propagate in the cladding regions 42, 44, 46. If the index difference between the core 30 and cladding 40 is reduced to 0.35%, the optical signal will be more loosely confined and more of the light will propagate in the cladding 40. For a configuration with a passive waveguide core 30 and an electrooptic cladding 40, more efficient electrooptic interaction will occur with the lower index difference. It is further noted that index differences between 0.3% and 1% are better-suited for construction of waveguides that are not susceptible to optical losses from slight bends in the waveguide.

The present invention is particularly advantageous in the context of guiding non-polarized light, i.e., optical signals including both a horizontally oriented component TE and a vertically oriented component TM. Specifically, the optical waveguides described include electrode arrangements and poling configurations that provide for electrooptic responses that are insensitive to the polarization of the optical signal with or without a driving voltage applied to the electrodes.

The waveguide 10 of the present invention is configured such that at least a portion of the cross section 12 of an optical signal propagating through the waveguide 10 along the longitudinal direction of the core 30 lies in an electrooptic material. The electrooptic material may be presented as part or all of the cladding 40, as part or all of the core 30, or as a combination thereof. For the purposes of describing and defining the present invention it is noted that electrooptic materials and substantially non-electrooptic materials may be distinguished based on the relative degree of variation in the refractive index induced in the material upon application of an electric field in the material. Electrooptic materials and non-electrooptic materials placed under similar electric fields undergo changes in refractive indices that are typically different by several orders of magnitude. As such, it is contemplated that, even though many materials utilized in optical waveguides exhibit very small changes in refractive index under the influence of an electric field, the difference between electrooptic and non-electrooptic materials will be readily apparent to those practicing the present invention.

Preferably, the electrooptic material comprises an electrooptic polymer. In electrooptic polymers, the electrooptic effect arises when originally randomly oriented chromophores with relatively large molecular hyperpolarizabilities are oriented along a common direction or contour —a process commonly known as poling. Typically, a polymer is poled by application of an electric field between two or more electrodes across the polymer. The polymer may be poled in any direction or along any contour by utilizing the electric field to align the chromophores in the poling process. According to the present invention, electrooptic polymers are poled in selected contours to provide polarization-independent behavior. The aggregate of directions in which the polymer is poled at each point within it is referred to herein as the poling contour.

Suitable electrooptic polymers are presented in U.S. patent application Ser. No. 09/777,439, filed Feb. 6, 2001, now U.S. Pat. No. 6,610,219. The present invention also contemplates the use of any other electrooptic materials that can be poled in a contour. For the purposes of defining and describing the present invention, it is noted that a contour generally comprises a curved line but may include straight and curved portions.

In FIGS. 1 and 2, the control electrodes 20, 22 are positioned to generate a contoured electric field across the cladding 40. In FIG. 1, the contoured electric field is illustrated with reference to equipotential lines 28. In FIG. 2, the contoured electric field is illustrated with reference to contour lines 26 and equipotential lines 28. The equipotential lines 28 in FIGS. 1 and 2 illustrate the magnitude and direction of the electric field. The magnitude of the electric field is represented by the spacing of the equipotential lines 28, where a closer spacing represents a higher magnitude. The direction of the electric field in any given point along one of the equipotential lines 28 is perpendicular to the tangent of the line at the given point and is illustrated with particularity by the contour lines 26 of FIG. 2.

The cladding 40 is poled along the contour defined by the electric field and, as such, the refractive index of the cladding 40 varies with position throughout the cladding 40. Accordingly, the cladding 40 defines an array of local TM indices of refraction $n_{TM}$ corresponding to the indices of refraction for the vertically oriented component TM of the optical signal in the cladding 40. The cladding 40 also defines an array of local TE indices of refraction $n_{TE}$ corresponding to the indices of refraction for the horizontally oriented component TE of the optical signal in the cladding 40. The local TM indices $n_{TM}$ collectively define the TM mode index of the waveguide 10 and the local TE indices $n_{TE}$ collectively define the TE mode index of the waveguide 10.

The local TM indices $n_{TM}$ and the local TE indices $n_{TE}$ are each a function of a first electrooptic coefficient $r_{PP}$ for light parallel to a local component of the contoured electric field and a second electrooptic coefficient $r_{1P}$ for light perpendicular to a local component of the contoured electric field. Other electrooptic coefficients may also characterize the electrooptic material but $r_{PP}$ and $r_{1P}$ are the two dominant coefficients. The difference between the first and second electrooptic coefficients $r_{PP}$ and $r_{1P}$ defines the optical birefringence of the electrooptic cladding material defining the cladding 40.

As is noted above, referring to the equipotential lines of FIGS. 1 and 2, the direction of the electric field at any given point along one of the equipotential lines is perpendicular to the tangent of the equipotential line at the given point. Accordingly, the poling contour of the polymer is also illustrated herein by reference to the equipotential lines of FIGS. 1 and 2 because the direction of the electric field also defines the direction in which the polymeric chromophores are oriented. The contoured electric field and the poling contour are configured to compensate for the optical birefringence of the electrooptic cladding material such that the TM mode index of the waveguide is substantially equal to the TE mode index of the waveguide. In this manner, the output of the optical waveguide 10 may be controlled independent of the polarization of the input optical signal. In cases where the waveguide 10 is silica-based glass, it will be preferable to select an electrooptic cladding material having a dielectric constant on the order of about 3.6, or some other relatively low dielectric constant, to avoid distortion of the electric field by the electrooptic material.

Figure 11:
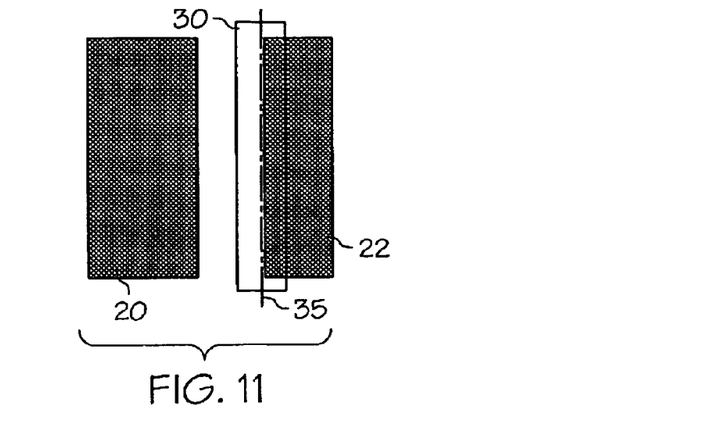
FIGS. 11–13 illustrate electrode and waveguide core configurations along a length dimension of an optical waveguide according to the present invention.
Figure 12:
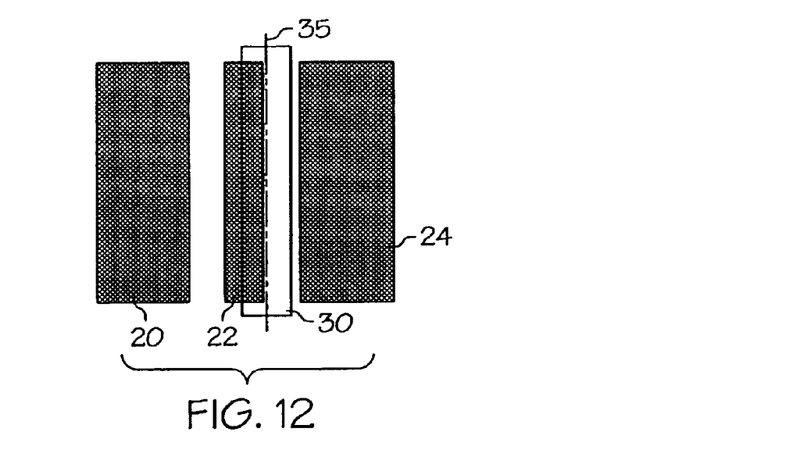
Figure 13:
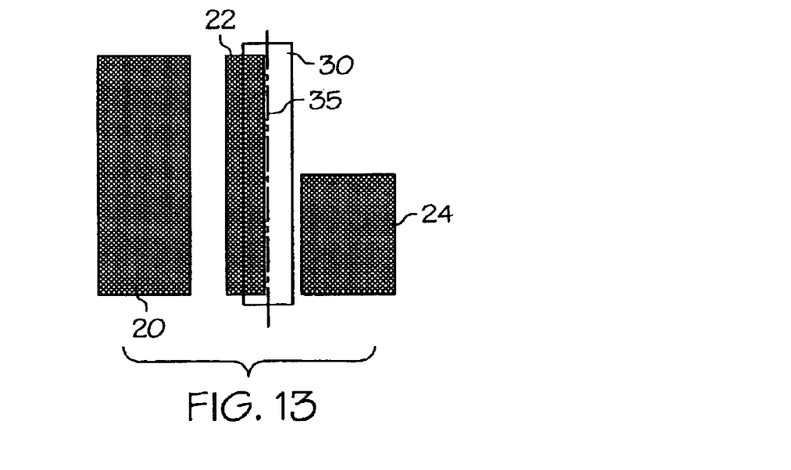

In the embodiments of FIGS. 1 and 2, the contoured electric field and the poling contour are asymmetric relative to an intersecting plane 32 normal to the surface of the waveguide core 30 and extending along the primary axis of propagation defined by the waveguide core 30. Generally, the contour of the electric field and the poling lines are such that (i) the vertical electric field component within the first lateral cladding region 42 is larger than a vertical electric field component in second lateral cladding region 44 and (ii) the horizontal electric field component within the first lateral cladding region 42 is smaller than the horizontal component in the second lateral cladding region 44. FIGS. 11–13 illustrate respective primary axes of propagation 35 for selected waveguide cores 30.

Typically, as is the case in the embodiments of FIGS. 1 and 2, the contoured electric field and the poling contour lie along a common contour because the same control electrodes 20, 22 are used to pole the electrooptic material and to drive the waveguide 10. However, it is contemplated that the poling lines and electric field need not follow a common contour. It is further contemplated that a suitably contoured electric field may be employed with an electrooptic material that is poled in a linear, uniform fashion or that a linear, uniform electric field may be employed with an electrooptic material poled along a suitable contour.

The poling voltage is selected to achieve optimum polarization of the electrooptic material and varies depending upon the dimensions and properties of the electrooptic material. The driving voltage, which is typically much less than the poling voltage, is selected to achieve a polarization-independent $\pi$ phase shift in the optical signal. Typical driving electric fields are in the range of about 1 V/$\mu$m to about 10 V/$\mu$m. For convenience of operation, the driving voltage and the poling voltage may have the same polarity and thus be co-directional. However, according to one embodiment of the present invention, the poling voltage and driving voltage can be opposite in polarity. Specifically, the poling voltage and the driving voltage applied to the control electrodes may be poled such that contra-directional electric fields are created in the cladding.

Generally, control electrodes utilized according to the present invention may be constructed of any suitable conductive or superconductive material and may be provided in thicknesses ranging from a few hundred angstroms to about 10 $\mu$m. In arranging the control electrodes of the present invention, care should be taken to ensure adequate spacing between the electrodes and areas of the device 10 carrying an optical signal. Preferably, the control electrodes of the present invention should be spaced about 1 $\mu$m to about 10 $\mu$m from the optical signal. If the electrodes are placed too close to the optical signals, significant optical attenuation will result. Alternatively, optically transparent electrodes such as indium tin oxide (ITO) can be used to produce the electric field. Optically transparent electrodes will not significantly reduce the optical signal in a nearby waveguide if they are appropriately designed.

A controller may be coupled to the control electrodes to enable proper control of the voltages applied thereto. The controller is merely illustrated schematically herein by reference to voltages $V_1$, $V_2$, and $V_3$ (see FIGS. 3–10). The controller is preferably programmed to operate the control electrodes at suitable poling and driving voltages but manual control is also contemplated.

FIGS. 1–10, 12, and 13 of the present application illustrate a variety of control electrode and core configurations suitable for achieving polarization independence according to the present invention. As will be appreciated by those practicing the present invention, the illustrated embodiments are not intended to present an exhaustive disclosure of all of the possible electrode and core configurations within the scope of the present invention. The appended claims also relate to a variety of configurations according to the present invention and the terms and phrases utilized therein take their meaning from the detailed description of the embodiments of FIGS. 1–10, 12, and 13. Accordingly, we turn now to a detailed description of the configurations illustrated in FIGS. 1–10, 12, and 13.

In FIG. 1, the first and second control electrodes 20, 22 are bound by a common edge plane at the interface between the cladding 40 and the superstrate 50 but define an asymmetric configuration. For the purposes of defining and describing the present invention, this common edge plane will be referred to herein as the common edge plane. In addition, the second control electrode 22 defines an electrode thickness dimension that is substantially less than the corresponding electrode thickness of the thicker remaining control electrode 20. The core 30 is positioned equidistant between the control electrodes (see FIG. 1). For the purposes of describing and defining the present invention, where a structural element defines a substantially uniform shape, like the quadrilaterals illustrated herein, a distance between two elements represents the distance between the closest points of the two elements, as opposed to the distance between the respective centroids of the two elements. However, where structures define irregular or non-uniform shapes it may be preferable to establish the distance between two elements as the distance between the centroids of the elements or to approximate the shapes of the non-uniform elements as uniform shapes.

In FIG. 2, the arrangement of the control electrodes 20, 22 is similar to that of FIG. 1 but the core 30 is offset from the common edge plane in which the electrodes lie. Further, the core 30 is positioned unequal distances from the control electrodes 20, 22, closer to the thinner control electrode 22. The core 30 may be positioned closer to the thicker control electrode 20 in FIG. 1 or FIG. 2, as long as the result is a configuration where the TM mode index of the waveguide 10 is substantially equal to the TE mode index of the waveguide 10. By way of example, the following parameters may apply to the arrangement of FIG. 2:

Before moving on to a discussion of the alternative configurations illustrated in FIGS. 3–10, 12 and 13, we turn to a detailed explanation of the manner in which polarization independence is achieved according to the present invention. Initially, we note that the process of poling the electrooptic material of the waveguide 10 orients the chromophores and locks them in place. As a result, the electrooptic material becomes anisotropic because, even without an electric field applied, the refractive index of the electrooptic material will depend on the orientation of the optical polarization. Once a driving voltage is applied to the control electrodes 20, 22 and a driving electric field is induced, the refractive indices will change further due to the electrooptic effect.

Once the electrooptic polymer is poled, the calculation of the optical propagation of the waveguide must account for the positional variation of the electric field and the refractive index of the waveguide 10. The calculation must also account for the fact that the evanescent tail of the optical signal falls off exponentially from the waveguide edge, as is illustrated by the cross section of the optical signal 12 in FIGS. 1 and 2. As a result, regions very close to the waveguide core 30 have more influence on the optical signal than materials a few microns away from the waveguide. Typically, for example, the height and width dimensions of the core 30 will vary from 2 $\mu$m to 8 $\mu$m where a 3×8 $\mu$m core having the illustrated orientation is preferred. The dimensions of the core 30 will typically increase as the difference between the indices of the core and cladding become smaller.

The calculation of the optical propagation of the waveguide must also take into account the electrooptic coefficient of the electrooptic material. Fortunately, although the electrooptic coefficient will also vary with position when the poling fields are not sufficient to completely pole the polymer, it is possible to render the degree of poling variation insignificant to the calculation. To do this, poling fields of sufficient magnitude and duration should be used to pole the polymer as completely as possible near the waveguide core 30. In practice, electrooptic coefficients on the order of between about 1 pm/V and 200 pm/V and electric fields in excess of 100 V/$\mu$m are preferred. It is contemplated that an accurate determination of suitable poling voltage characteristics for completely poling the electrooptic material near the waveguide core 30 will depend upon the dimensions and properties of the various waveguide components and are best left to experimental determination.

The respective TM and TE mode indices may be calculated using a software model incorporating: 1) a calculation of the electric field contours within the electrooptic material; 2) a calculation of the birefringence of the waveguide

| | |
|---|---|
| Poling Voltage: | Dielectric Constant Of Electrooptic Cladding: |
| 1500 V (100 V/$\mu$m) | 2.25 |
| Electrode Dimensions: | Refractive Index of Cladding at 1550 nm: |
| 9 $\mu$m × 10 $\mu$m; | 1.444 |
| 1 $\mu$m × 10 $\mu$m | |
| Free Space Wavelength: | Electrode Separation: |
| 1550 nm | 15 $\mu$m |
| Refractive Index of Doped Silica Core: | Core Position: |
| 1.4542 | 3 $\mu$m below top surface of electrodes |
| | 6.75 $\mu$m right of center |
| Core Height and Width: | Electrooptic Coefficients: |
| 8 $\mu$m × 3 $\mu$m | $r_{PP}$ = 60 pm/V; |
| | $r_{1P}$ = 20 pm/V | resulting from the poling process; and 3) a calculation of the electrooptically induced change in refractive index of the waveguide. The electric field contours in the device are calculated using a finite element model that incorporates the electrode geometry and the dielectric constants of the cladding 40 and core 30 materials. As will be appreciated by those familiar with finite element analysis, the finite element model divides the problem space into a finite number of elements having a selected size, e.g., 0.5 µm by 0.5 µm.

During the poling process, the chromophores within the electrooptic material are aligned and the refractive index becomes polarization dependent, or birefringent. The amount of local birefringence at any specific point in the electrooptic material can be determined from the strength and direction of the electric field and the material properties. Since the electric field forms a contour and varies in both magnitude and direction throughout the electrooptic material, a coordinate transformation should be used to determine the amount of local birefringence at any specific point in the electrooptic material relative to the horizontal and vertical axes. The details of the coordinate transformation may be derived from conventional planar geometry. Similarly, the manner in which optical birefringence of a material may be calculated from the dominant electrooptic coefficients of the material and the applied electric field may be determined from conventional teachings in the area of electrooptic waveguide devices. For common electrooptic polymers, a field of 100 V/µm will induce a birefringence of 0.003. This means that the refractive index of the material as seen by light polarized in the direction of the electric field will be larger than the index seen by light polarized perpendicular to the electric field by 0.003.

Once the local birefringence is determined for each element in a 0.5 µm by 0.5 µm grid, the overall waveguide birefringence can be determined using an optical beam-propagation model. The mode index for each polarization is treated separately. The difference between the TM and TE mode indices is the waveguide birefringence.

To calculate the electrooptically-induced change in refractive index, the electrooptic material is again divided into finite elements of constant index. The refractive index is then calculated as a function of voltage for both TE and TM polarized light and each element may be characterized by a refractive index associated with the horizontal axis (and thus TE polarization) and a refractive index associated with the vertical axis (and thus TM polarization). This array of refractive indices is then provided as input to an optical beam propagation model that calculates the propagation of an optical signal through this array of indices. Finally, a doped-silica waveguide is placed within the refractive index array and the propagation characteristics of the waveguide are determined using beam propagation modeling software. The calculation is carried out twice, once for TM polarized light (with the vertical index array) and once for TE polarized light (with the horizontal index array).

Figure 3:
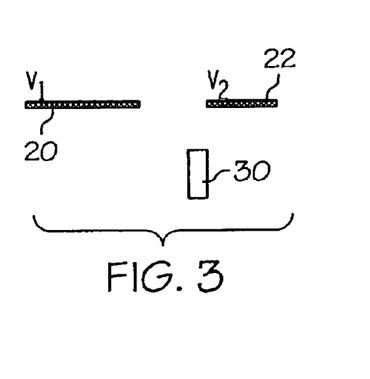
FIGS. 3 through 10 illustrate alternative electrode and waveguide core configurations according to the present invention.

Referring now to FIG. 3, a configuration is illustrated wherein the control electrodes 20, 22 define an asymmetric configuration, lie in a common edge plane, and define substantially equal electrode thickness dimensions. The core 30 is offset from the common edge plane and is positioned closer to the second control electrode 22. It is contemplated that polarization-independent operation could also be achieved if the electrodes 20, 22 were symmetric or if the core 30 were placed closer to the first control electrode 20. Such modifications would often necessitate corresponding changes to the configuration of another electrical, optical, or electrooptical element of the waveguide.

Figure 4:
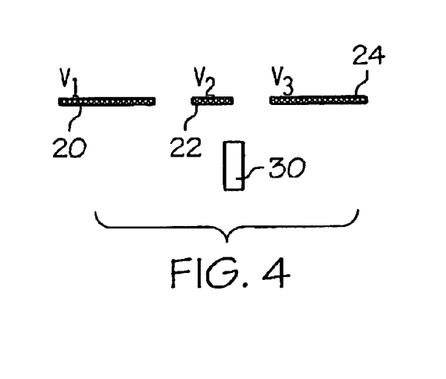
Figure 5:
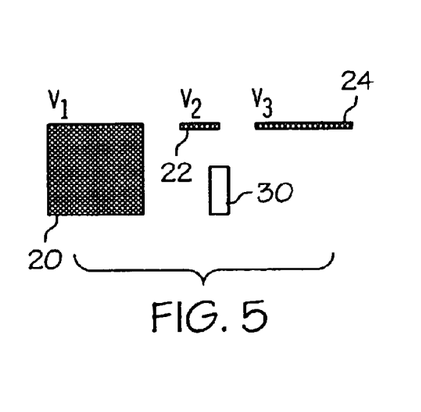
Figure 6:
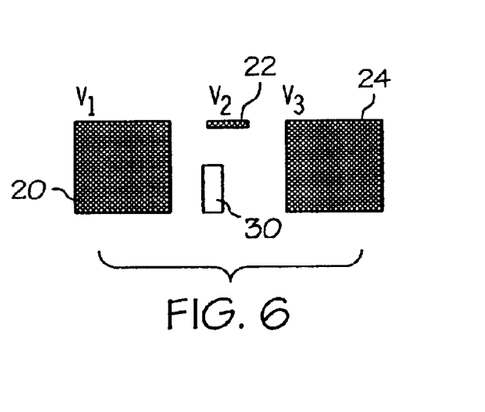
Figure 7:
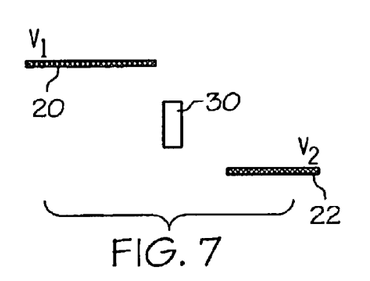
Figure 8:
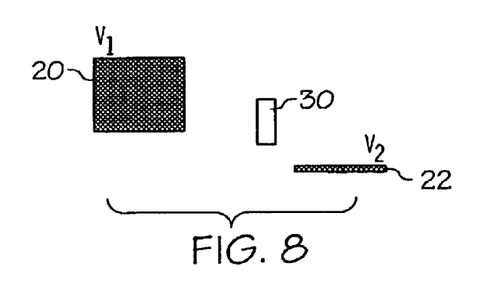

In the embodiment of FIG. 4, first, second, and third electrodes 20, 22, 24 are symmetrically arranged in a common edge plane. Each of the electrodes define substantially equal thicknesses. The core 30 is offset from the axis of symmetry of the control electrodes 20, 22, 24 and from the common edge plane. In FIG. 5, the thickness of the first electrode 20 exceeds that of the remaining two electrodes. In FIG. 6, the second electrode 22 is substantially thinner than the remaining two electrodes 22, 24 and the core is positioned closer to the first control electrode 20. Possible variations to the arrangements illustrated in FIGS. 4–6 include, but are not limited to: modification of the electrode structure from symmetric to asymmetric, or from asymmetric to symmetric, modification of the thickness of one or more of the electrodes, elimination of an electrode, repositioning of the core closer to a selected electrode, etc. Of course, such modifications would often necessitate corresponding changes to the configuration of another electrical, optical, or electrooptical element of the waveguide.

Figure 9:
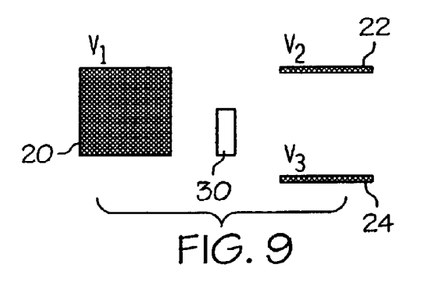
Figure 10:
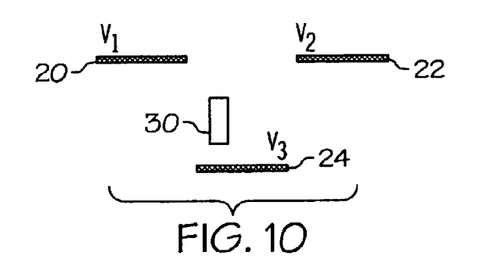

In the embodiments of the present invention where two control electrodes are utilized, one of the electrodes is at a positive voltage and the other of the control electrodes is at ground or a suitable negative voltage. The arrangements of FIGS. 4, 5, and 6, and some of the embodiments discussed below, include provision for three control electrodes. Each of the three electrodes may be operated at different voltages. However, it is more typical to operate two of the electrodes at a common voltage and select a third electrode for operation at a higher or lower voltage. Specifically, in FIGS. 4–6, the first and third electrodes 20, 24 are typically operated at a relatively high positive voltage $V_1$, $V_3$ while the second electrode 22 is operated at a lower voltage $V_2$. In FIGS. 9 and 10, discussed in further detail below, the first and second electrodes 20, 22 are typically operated at a relatively high positive voltage $V_1$, $V_2$ while the third electrode 24 is operated at a lower voltage $V_2$. Of course, it is contemplated that the polarity of the voltage examples recited with reference to FIGS. 4–6 and 9–10 could be reversed to arrive at the same effect.

The embodiments of FIGS. 7–10 contemplate symmetric or asymmetric electrode arrangements where the waveguide comprises first and second control electrodes 20, 22 lying in parallel planes and the core 30 is positioned between the parallel planes. The embodiments of FIGS. 9 and 10 include a third control electrode 24. In each of these embodiments, the first control electrode 20 is limited to extend for a majority of its width along one side of the core 30 and the second control electrode 22 is limited to extend for a majority of its width along the other side of the core 30. Further, in each case, the core 30 is positioned unequal distances from the control electrodes 20, 22, 24. As is noted above, possible variations to the arrangements illustrated in FIGS. 7–10 include, but are not limited to: modification of the electrode structure from symmetric to asymmetric, or from asymmetric to symmetric, modification of the thickness of one or more of the electrodes, elimination of an electrode, repositioning of the core closer to a selected electrode, etc. Of course, such modifications would often necessitate corresponding changes to the configuration of another electrical, optical, or electrooptical element of the waveguide.

Referring now to FIGS. 11–13, respective primary axes of propagation 35 and the relative length dimensions of the control electrodes along the axes 35 are illustrated. Specifically, referring to FIG. 11, the first and second control electrodes 20 and 22 are illustrated with substantially equal length dimensions that extend for substantially the entire length of the waveguide core 30. Similarly, in FIG. 12, the first, second, and third control electrodes 20, 22, 24 each define substantially equal length dimensions that extend for substantially the entire length of the waveguide core 30. Alternatively, as is illustrated in FIG. 13, in the case of an electrode configuration including three or more electrodes, one of the control electrodes 20, 22, 24, e.g., the third control electrode 24, may have a reduced length dimension along the primary axis of propagation 35 of the waveguide core 30. The reduced length of the third control electrode 24 may be selected to provide for further compensation for birefringence resulting from differences between the TM and TE mode indices of the waveguide.

Figure 14A:
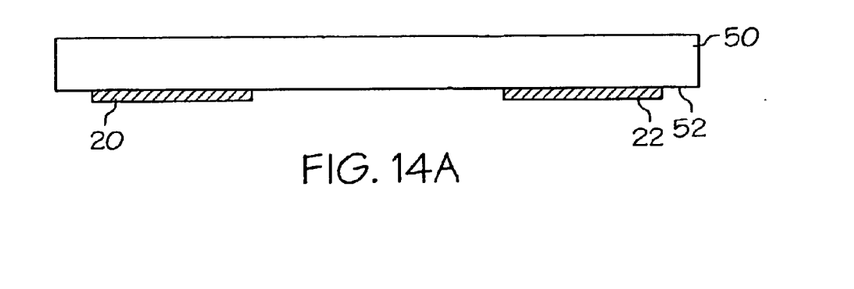
FIGS. 14A through 14D illustrate a process for forming a waveguide according to the present invention.
Figure 14B:
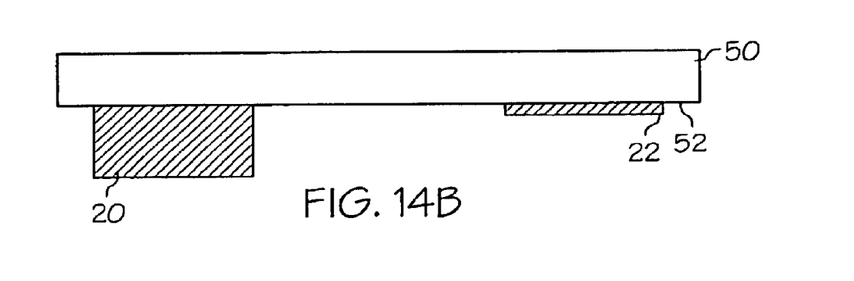
Figure 14C:
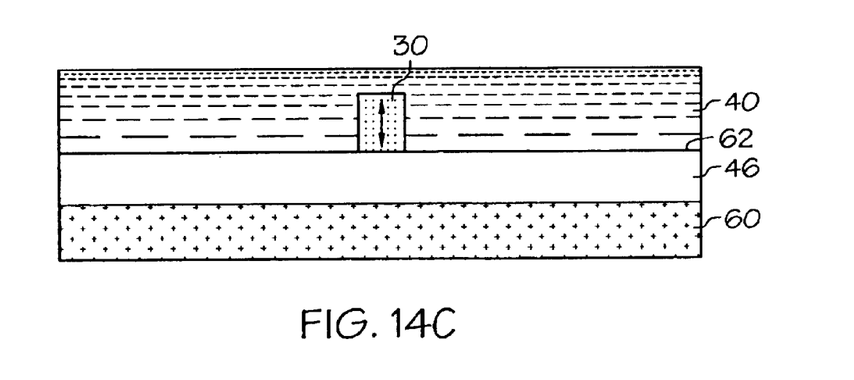

FIGS. 14A–14D illustrate a process for forming an electrooptic waveguide according to the present invention. Referring to FIG. 14A, two control electrodes 20, 22 are provided on a first surface 52 of the waveguide superstrate 50. The respective thicknesses of one or both of the electrodes may be selectively increased by forming the electrodes as part of a plating process or any other selective formation process (see FIG. 14B). Similarly, the optical waveguide core 30 is provided over a first surface 62 of the waveguide substrate 60. Next, a viscous electrooptic cladding material 40 is provided over the first surface 62 of the substrate 60, which may include a cladding region 46. The viscous cladding material 40 may also be provided over the first surface 52 of the superstrate 50, or both (see FIG. 14C). Finally, the surfaces 52, 62 are urged toward each other to create a structure having a layer of cladding material interposed between the surfaces 52, 62. Finally, the cladding material 40 is cured, yielding a unitary waveguide structure 10 (see FIG. 14D).

Figure 14D:
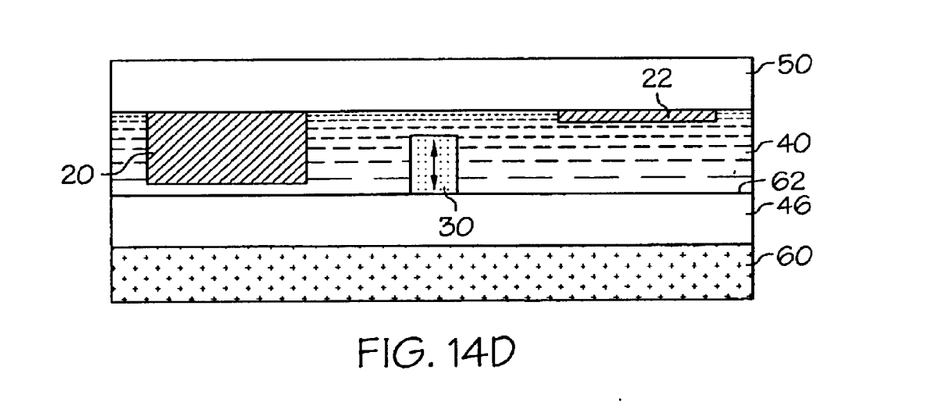
Figure 15:
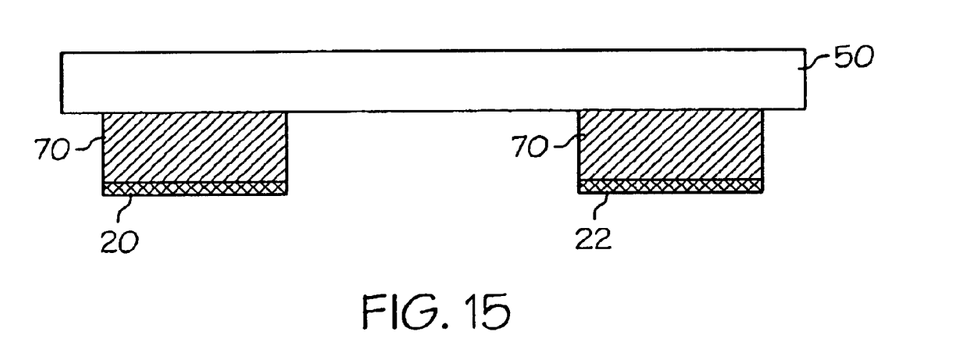
FIGS. 15 and 16 illustrate variations to the process of FIGS. 14A–14D.
Figure 16:
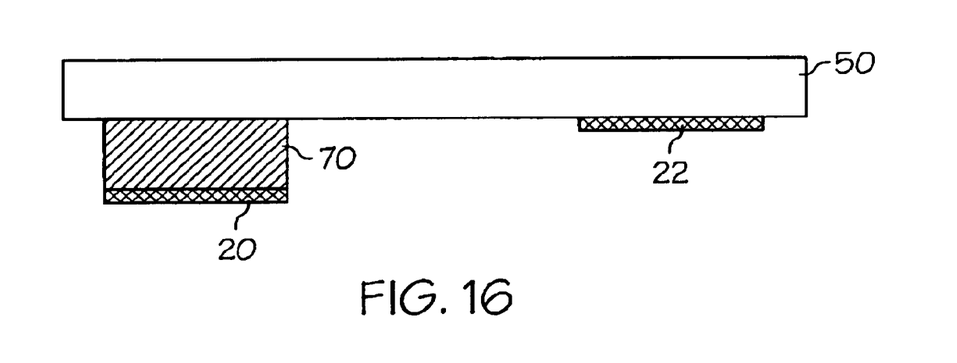

The cladding material 40 defines a cladding material viscosity selected to permit dispersion of the cladding material 40 about the control electrodes 20, 22 and the core 30 as the first surface 62 of the waveguide substrate 60 and the first surface 52 of the waveguide superstrate 50 are urged toward each other. As is illustrated in FIG. 14D, the cladding material 40 is provided in a quantity sufficient to ensure that the layer of cladding material 40 defines a cladding layer thickness at least as large as the selected electrode thicknesses.

Variations to the manufacturing scheme illustrated in FIGS. 14A–14D are illustrated in FIGS. 12 and 13. Specifically, it is noted that the control electrodes 20, 22 may be formed over an intervening material 70 that is formed over the superstrate 50. This approach adds additional flexibility in positioning the control electrodes relative to the core 30 and each other. Further, this approach can reduce material costs if the intervening material is less expensive than the electrode material.

For the purposes of describing and defining the present invention, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

The term "symmetric" is utilized herein to represent correspondence in size, shape, and relative position of parts on opposite side of a dividing line or median plane. Where a component is identified as being between two other components or reference planes, it is understood that all or a portion of the component may be between the two other components or reference planes.

Having described the invention in detail and by reference to preferred embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A process wherein an electrooptic waveguide is formed by:
   providing a waveguide substrate;
   positioning an optical waveguide core over a first surface of said substrate;
   providing a waveguide superstrate;
   forming at least two control electrodes on a first surface of said superstrate, wherein said control electrodes define selected electrode thicknesses;
   positioning a viscous electrooptic cladding material over one or both of said first surface of said substrate and said first surface of said superstrate; and
   urging said first surface of said waveguide substrate and said first surface of said waveguide superstrate toward each other to create a layer of cladding material between said surfaces, wherein
      said cladding material defines a cladding material viscosity selected to permit dispersion of said cladding material about said control electrodes and said core as said first surface of said waveguide substrate and said first surface of said waveguide superstrate are urged toward each other, and
      said cladding material is provided in a quantity sufficient to ensure that said layer of cladding material defines a cladding layer thickness at least as large as said selected electrode thicknesses.

2. A process as claimed in claim 1 wherein said control electrodes are formed on a first surface of said superstrate by forming successive electrode plates to said selected electrode thicknesses.

3. A process as claimed in claim 1 wherein said control electrodes are formed to define respectively different electrode thicknesses.

* * * * *